(12) United States Patent
Wang et al.

(10) Patent No.: US 11,386,864 B2
(45) Date of Patent: Jul. 12, 2022

(54) DISPLAY PANEL AND DISPLAY DEVICE

(71) Applicants: Hefei BOE Display Technology Co., Ltd., Anhui (CN); BOE Technology Group Co., Ltd., Beijing (CN)

(72) Inventors: Huiming Wang, Beijing (CN); Min Wang, Beijing (CN); Jing Ma, Beijing (CN); Peng Zhao, Beijing (CN); Xiuqin Yang, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/262,137

(22) PCT Filed: Apr. 13, 2020

(86) PCT No.: PCT/CN2020/084525
§ 371 (c)(1),
(2) Date: Jan. 21, 2021

(87) PCT Pub. No.: WO2021/207889
PCT Pub. Date: Oct. 21, 2021

(65) Prior Publication Data
US 2022/0114981 A1      Apr. 14, 2022

(51) Int. Cl.
*G09G 3/36*     (2006.01)
(52) U.S. Cl.
CPC ... *G09G 3/3685* (2013.01); *G09G 2300/0828* (2013.01); *G09G 2310/0286* (2013.01);
(Continued)

(58) Field of Classification Search
None
See application file for complete search history.

(56) References Cited

U.S. PATENT DOCUMENTS 10,249,244 B2    4/2019    Kim et al.
10,395,589 B1    8/2019    Vahid Far et al.
(Continued)

FOREIGN PATENT DOCUMENTS

CN    107331365 A    11/2017
CN    206628250 U    11/2017
(Continued)

OTHER PUBLICATIONS

International Search Report issued in PCT/CN2020/084525 dated Jan. 14, 2021, (9p).

*Primary Examiner* — Dorothy Harris
(74) *Attorney, Agent, or Firm* — Arch & Lake LLP

(57) ABSTRACT

A display panel includes a plurality of source driving chips, a power management circuit, and a plurality of switching units. The power management circuit includes a first output terminal, and the first output terminal is configured to provide a digital power signal to the source driving chips; and the plurality of switching units are respectively arranged corresponding to at least one of the source driving chips, the switching units are connected to the first output terminal and the corresponding source driving chips, and at least part of the switching units are configured to turn on the corresponding source driving chips and the first output terminal in different time periods in response to different control signals.

20 Claims, 8 Drawing Sheets

(52) U.S. Cl.
CPC . *G09G 2310/08* (2013.01); *G09G 2320/0257* (2013.01); *G09G 2330/021* (2013.01)

(56) References Cited

U.S. PATENT DOCUMENTS

| | | | |
|---|---|---|---|
| 10,769,995 B2 | 9/2020 | Min et al. | |
| 2007/0076159 A1* | 4/2007 | Lee | G09G 3/3677 349/149 |
| 2009/0295699 A1* | 12/2009 | Korenari | H01L 29/78621 327/365 |
| 2018/0204533 A1* | 7/2018 | Sasaki | G06F 1/3218 |
| 2020/0357320 A1* | 11/2020 | Park | G09G 3/20 |

FOREIGN PATENT DOCUMENTS

| | | |
|---|---|---|
| CN | 107564463 A | 1/2018 |
| CN | 107945753 A | 4/2018 |
| CN | 109906475 A | 6/2019 |
| CN | 209281854 U | 8/2019 |

\* cited by examiner

Prior Art

US 11,386,864 B2

DISPLAY PANEL AND DISPLAY DEVICE

CROSS-REFERENCE TO RELATED APPLICATIONS

This application is a national phase application under 35 U.S.C. § 371 of International Patent Application No. PCT/CN2020/084525, filed on Apr. 13, 2020, the entire contents of which are incorporated herein by reference as a part of this application.

TECHNICAL FIELD

The present disclosure relates to the field of display technology, and more particularly, to a display panel and a display device.

BACKGROUND

In a liquid crystal display panel, each output channel of a source driving circuit generally includes two power amplifiers, which are respectively used to output a positive driving signal and a negative driving signal. The source driving circuit includes a power-on reset stage and a data signal output stage when it is working. In the power-on reset stage, output terminals of the two power amplifiers of each output channel are short-circuited to neutralize the charge of a data line; and in the output stage, one of the two power amplifiers outputs a drive signal to the data line. However, when output voltages of the two power amplifiers are different, a current may be generated in each output channel during the power-on reset stage. The currents of a plurality of output channels converge, causing the current of an analog power signal output bus to be too large, thereby damaging components connected to the output bus.

It should be noted that the information disclosed in the background section above is only used to enhance the understanding of the background of the present disclosure, and therefore may include information that does not constitute the prior art known to those of ordinary skill in the art.

SUMMARY

According to an aspect of the present disclosure, there is provided a display panel, comprising a plurality of source driving chips, a power management circuit, and a plurality of switching units. The power management circuit comprises a first output terminal, and the first output terminal is configured to provide a digital power signal to the source driving chips; and the plurality of switching units are respectively arranged corresponding to at least one of the source driving chips, the switching units are connected to the first output terminal and the corresponding source driving chips, and at least part of the switching units are configured to turn on the corresponding source driving chips and the first output terminal in different time periods in response to different control signals.

In an exemplary embodiment of the present disclosure, each of the switching units is arranged corresponding to the same number of the source driving chips.

In an exemplary embodiment of the present disclosure, control terminals of different switching units are connected to different control signal terminals, and the switching units are turned on sequentially under the action of the control signal terminals.

In an exemplary embodiment of the present disclosure, the switching unit is arranged in a one-to-one correspondence with the source driving chip.

In an exemplary embodiment of the present disclosure, the display panel further comprises a shift signal output circuit, which includes a plurality of cascaded shift register units, the shift register units are arranged in a one-to-one correspondence with the switching units, and output terminals of the shift register units are connected to control terminals of the switching units, to sequentially input a shift signal to the plurality of the switching units.

In an exemplary embodiment of the present disclosure, the display panel comprises a clock control circuit, and the shift signal output circuit outputs the shift signal under the action of a clock signal and an initialization signal, which are provided by the clock control circuit.

In an exemplary embodiment of the present disclosure, the power management circuit further comprises a second output terminal for providing an analog power signal, and the display panel further comprises a boost circuit, which is connected between the second output terminal and the plurality of source driving chips, and is configured to boost the analog power signal and provide the source driving chips with boosted analog power signal.

In an exemplary embodiment of the present disclosure, the switching unit comprises a switching transistor, wherein a first terminal of the switching transistor is connected to the first output terminal, a second terminal thereof is connected to the corresponding source driving chip, and a control terminal thereof is connected to the control signal terminal.

In an exemplary embodiment of the present disclosure, the source driving chip comprises: a first power amplifier for outputting a positive driving signal; and a second power amplifier for outputting a negative driving signal, wherein the first power amplifier and the second power amplifier have different driving currents.

According to an aspect of the present disclosure, there is provided a display panel driving method for driving the above display panel, comprising:

in a power-on reset stage of the source driving chip, inputting different control signals to at least part of the control terminals of the switching units to turn on the switching units in different time periods.

In an exemplary embodiment of the present disclosure, the control terminals of different switching units are connected to different control signal terminals, and the driving method comprises: sequentially inputting turned-on signals to the different control signal terminals.

According to an aspect of the present disclosure, there is provided a display device comprising the above display panel.

Other characteristics and advantages of the present disclosure will become apparent through the following detailed description, or partly learned through the practice of the present disclosure.

It is to be understood that both the foregoing general description and the following detailed description are exemplary and explanatory only and are not restrictive of the present disclosure.

BRIEF DESCRIPTION OF THE DRAWINGS

The drawings herein, which are incorporated in and constitute a part of this specification, illustrate embodiments consistent with the present disclosure, and serve to explain the principles of the present disclosure together with the description. Obviously, the drawings in the following description are just some embodiments of the present disclosure. For those of ordinary skill in the art, other drawings may be obtained based on these drawings without creative efforts.

DETAILED DESCRIPTION

Figure 1:
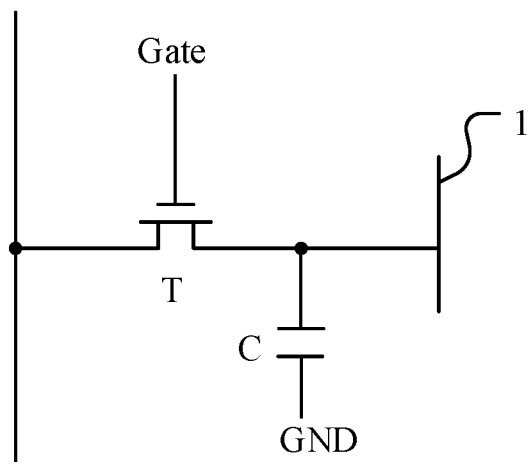
FIG. 1 is a schematic structural diagram of a pixel driving circuit.

Example embodiments will now be described more fully with reference to the accompanying drawings. However, the example embodiments can be implemented in various forms, and should not be construed as being limited to the examples set forth herein; rather, these embodiments are provided so that this disclosure will be thorough and complete, and will fully convey the concept of the example embodiments to those skilled in the art. The described features, structures or characteristics can be combined in one or more embodiments in any suitable way. In the following description, many specific details are provided to give a sufficient understanding of the embodiments of the present disclosure. However, those skilled in the art will realize that the technical solutions of the present disclosure can be practiced without one or more of the specific details, or other methods, components, devices, steps, and the like can be used. In other cases, the known technical solutions are not shown or described in detail in order to avoid a presumptuous gest usurps the role of the host and unnecessarily causing obscuring various aspects of the present disclosure.

In addition, the drawings are only schematic illustrations of the present disclosure, and are not necessarily drawn to scale. The same reference numerals in the drawings denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The terms "a", "an", "the", and "said" are used to indicate the presence of one or more elements/components/etc.; the terms "comprising" and "including" are used to indicate open-ended inclusive means, and means that there may be additional elements/components/etc., in addition to the listed elements/components/etc.; and the terms "first" and "second" are only used as markers, not to limit the number of objects.

In the related art, in order to avoid the polarization of a liquid crystal, a liquid crystal display panel generally adopts a positive and negative alternate driving method, for example, frame inversion, row inversion, dot inversion, column inversion driving methods, and the like.

As shown in FIG. 1, which is a schematic structural diagram of a pixel driving circuit, the pixel driving circuit includes a switching transistor T and a capacitor C. A first terminal of the switching transistor is connected to a data signal terminal Data, and a second terminal thereof is connected to a pixel electrode 1, and a control terminal thereof is connected to a gate drive signal terminal Gate. The capacitor C is connected between the second terminal of the switching transistor T and a ground terminal. The gate drive signal terminal Gate is used to input a gate drive signal to the switching transistor to turn on the switching transistor T. The data signal terminal Data is used to provide a data signal to the pixel electrode 1 through the switching transistor T to display a corresponding grayscale image. The capacitor C is used to maintain the voltage of the pixel electrode.

Figure 2:
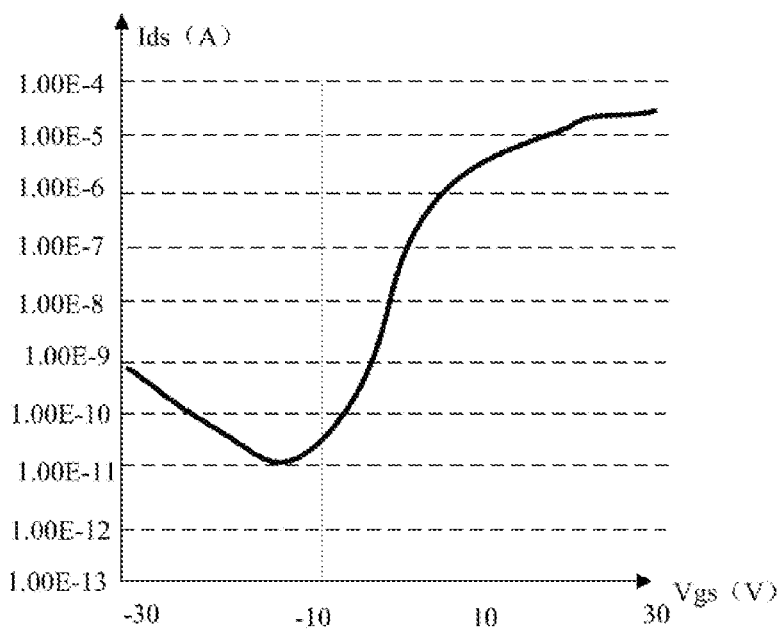
FIG. 2 is a diagram of the relationship between a gate-source voltage and a charging current of a switching transistor.

As shown in FIG. 2, which is a diagram of the relationship between a gate-source voltage and a charging current of the switching transistor, the abscissa is the gate-source voltage Vgs of the switching transistor, and the ordinate is the charging current Ids of the switching transistor. It can be seen from FIG. 2 that the gate-source voltage Vgs is positively correlated with the charging current Ids, when the gate-source voltage Vgs is greater than −10V. Since the liquid crystal display panel adopts the positive and negative alternate driving method, the switching transistor in FIG. 1 has different gate-source voltages Vgs during the positive driving and the negative driving, thereby having different charging speeds during the positive driving and the negative driving. For example, the effective voltage of the gate drive signal terminal in FIG. 2 is 30V, and the voltage of a common electrode of a pixel unit is 9V. When an image with 255 grayscales is displayed, the data signal for the positive driving of the pixel unit is 18V, and the data signal for the negative driving is 0V. The gate-source voltage of the switching transistor in positive driving is Vgs=12V, and the gate-source voltage of the switching transistor in negative driving is Vgs=30V. Obviously, the charging speed of the pixel electrode in the negative driving is greater than the charging speed of the pixel electrode in the positive driving.

Figure 3:
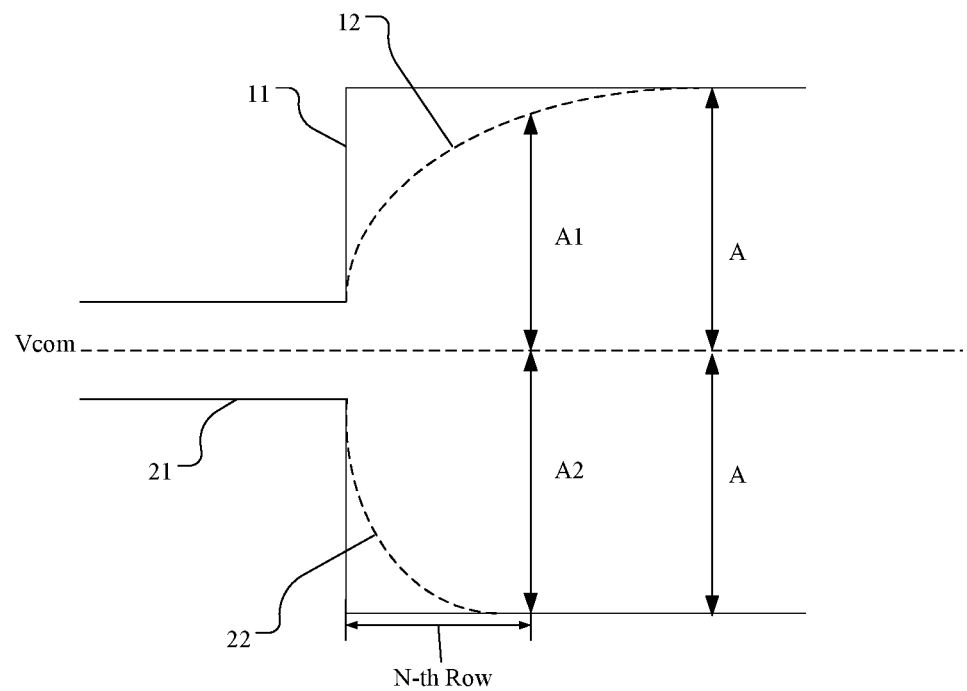
FIG. 3 is a comparison diagram of the charging speed of a pixel electrode in a positive driving and a negative driving.

As shown in FIG. 3, which is a comparison diagram of the charging speed of the pixel electrode in the positive driving and the negative driving, Vcom is the voltage of the common electrode of the pixel unit, 11 refers to the voltage of an output terminal of a source driving circuit during the positive driving, 12 is the voltage of the pixel electrode during the positive driving, 21 refers to the voltage of an output terminal of the source driving circuit during the negative driving, and 22 is the voltage of the pixel electrode during the negative driving. The maximum voltage difference between the output terminal of the source driving circuit and the common electrode during the positive driving may be equal to the maximum voltage difference between the output terminal of the source driving circuit and the common electrode during the negative driving. As shown in FIG. 3, the voltage difference may each be A. It can be seen from FIG. 3 that the charging speed of the pixel electrode in the negative driving is greater than the charging speed of the pixel electrode in the positive driving. Wherein during the driving process of the pixel unit of the Nth row, in the positive driving, the voltage of the pixel electrode fails to be charged to the maximum voltage of the output terminal of the source driving circuit, and the maximum voltage difference between the pixel electrode and the common electrode is A1; and in the negative driving, the voltage of the pixel electrode is charged to the minimum voltage of the output terminal of the source driving circuit, and the maximum voltage difference between the pixel electrode and the common electrode is A2. Apparently, A1 is less than A2, that is, the bias voltage of the pixel electrode in the negative driving is greater than the bias voltage of the pixel electrode in the positive driving. When the pixel unit displays a fixed grayscale, the voltage of the pixel electrode during the negative driving and the voltage of the pixel electrode during the positive driving cannot be neutralized to the voltage of the common electrode Vcom, such that the voltage of the pixel electrode is deviated from the voltage of the common electrode Vcom, which finally causes the pixel unit cannot display the grayscale normally. Especially in neighboring areas of black and white display (the bias voltage of the pixel electrode in a white display area is the most serious, and the bias voltage of the pixel electrode in a black display area is the smallest), the state of the bias voltage of the pixel electrode differs greatly, resulting in an afterimage on a boundary line of a black and white screen.

Figure 4:
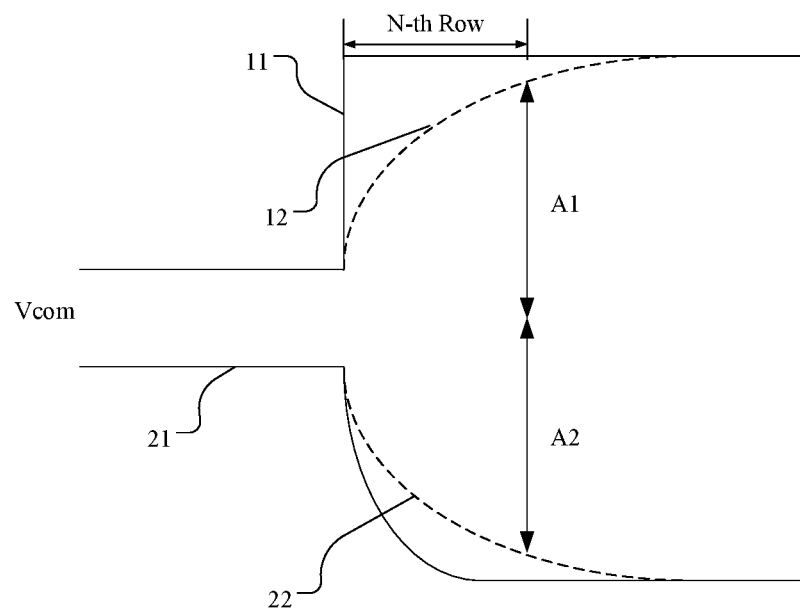
FIG. 4 is another comparison diagram of the charging speed of the pixel electrode in the positive driving and the negative driving.

In order to solve the above display afterimage problem, it needs to improve the source driving circuit to extend the length of a negative data signal falling edge of the source driving circuit in the related art. As shown in FIG. 4, which is another comparison diagram of the charging speed of the pixel electrode in the positive driving and the negative driving, Vcom is the voltage of the common electrode of the pixel unit, 11 refers to the voltage of the output terminal of the source driving circuit during the positive driving, 12 is the voltage of the pixel electrode during the positive driving, 21 refers to the voltage of the output terminal of the source driving circuit during the negative driving, and 22 is the voltage of the pixel electrode during the negative driving. It can be seen from FIG. 4 that the driving method extends the length of the negative data signal falling edge of the output terminal of the source driving circuit, thereby extending the length of a voltage falling edge of the pixel electrode during the negative driving, so that the charging speed of the pixel electrode in the positive driving is the same as the charging speed of the pixel electrode in the negative driving. Thus, under the same grayscale driving, the bias voltage of the pixel electrode relative to the common electrode in the positive driving is equal to the bias voltage of the pixel electrode relative to the common electrode in the negative driving. For example, as shown in FIG. 4, when the pixel unit of the Nth row is driven, the voltage difference between the pixel electrode and the common electrode in the positive driving is A1, and the voltage difference between the pixel electrode and the common electrode in the negative driving is A2, where A1=A2.

Figure 5:
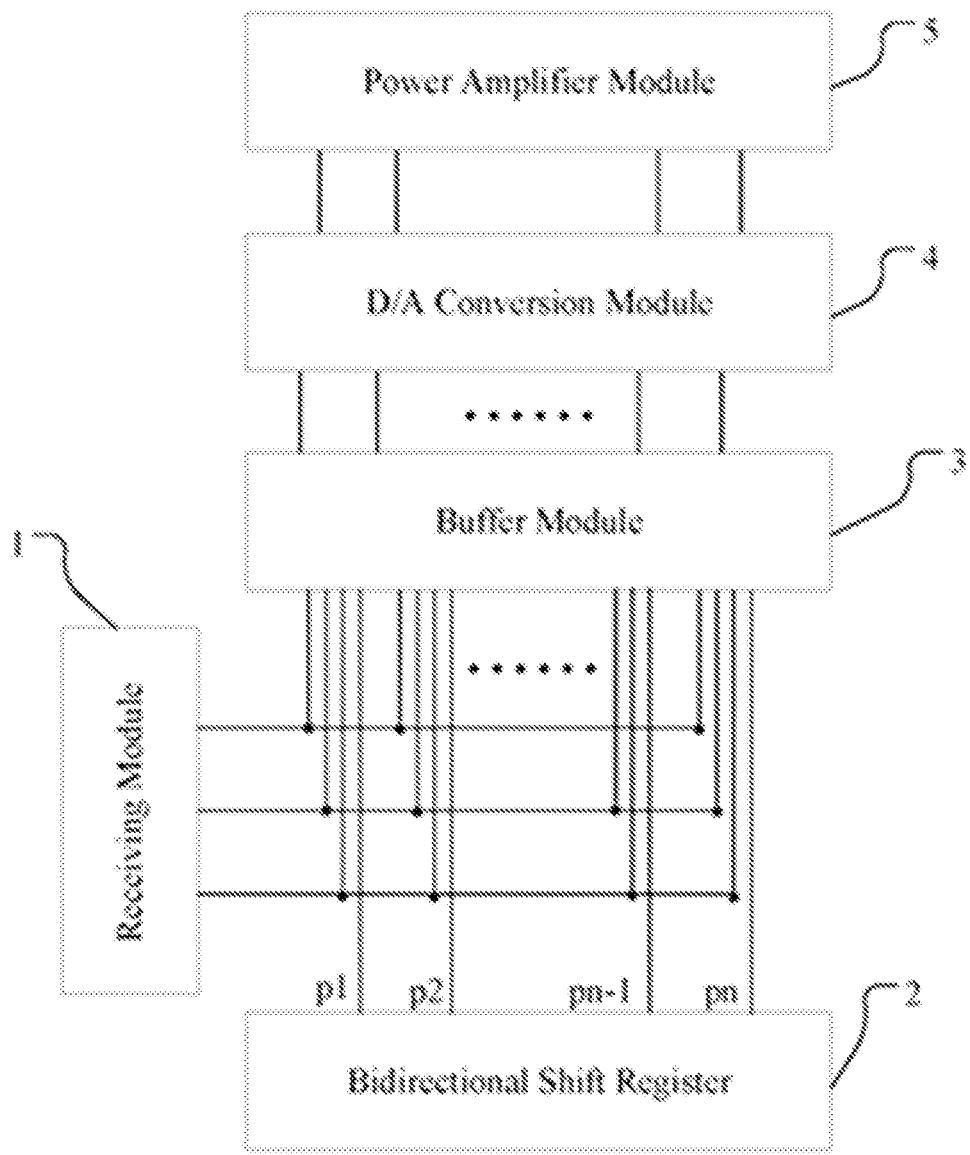
FIG. 5 is a schematic structural diagram of a source driving circuit in the related art.

As shown in FIG. 5, which is a schematic structural diagram of a source driving circuit in the related art, the source driving circuit may include: a receiving module 1, a bidirectional shift register 2, a buffer module 3, a digital-to-analog conversion module 4, and a power amplifier module 5. The receiving module 1 is used to receive digital data signals; the bidirectional shift register 2 outputs shift signals p1, p2, . . . pn sequentially under the control of a clock signal, so as to sequentially transmit the digital data signals received by the receiving module 1 to the buffer module; the buffer module may include a data latch, which is used to simultaneously transmit the digital data signals to the digital-to-analog conversion module; the digital-to-analog conversion module may include a plurality of digital-to-analog converters, and may be connected to a gamma voltage adjustment circuit, and the digital-to-analog converters can convert the digital data signals into analog data signals based on the gamma voltage input by the gamma voltage adjustment circuit; and the power amplifier module may include a plurality of power amplifiers, and the power amplifiers can receive the analog data signals and improve the driving ability of the analog data signals.

Figure 6:
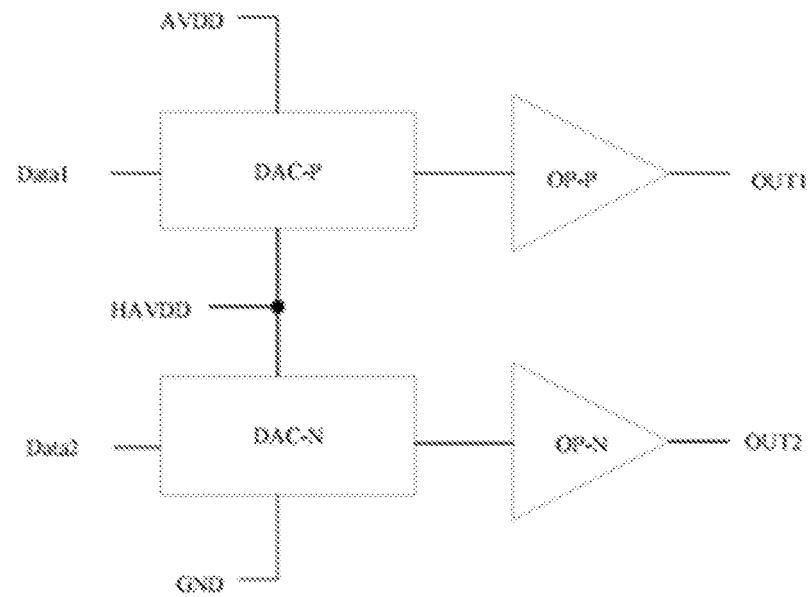
FIG. 6 is a schematic diagram of a part of the structure of the source driving circuit in the related art.

As shown in FIG. 6, which is a schematic diagram of a part of the structure of the source driving circuit in the related art, a part of the structures of the digital-to-analog conversion module and the power amplifier module is shown. Each output channel of the source driving circuit for connecting the data line may be provided with a first digital-to-analog converter DAC-P, a second digital-to-analog converter DAC-N, a first power amplifier OP-P, and a second power amplifier OP-N. A high level terminal of the first digital-to-analog converter DAC-P is connected to an analog power signal terminal AVDD, and a low level terminal thereof is connected to a half-value analog power signal terminal HAVDD; and a high level terminal of the second digital-to-analog converter DAC-N is connected to the half-value analog power signal terminal HAVDD, and a low level terminal thereof is connected to a ground terminal GND. Wherein the first digital-to-analog converter DAC-P receives a digital data signal Data1 and inputs a digital-to-analog converted analog data signal to the first power amplifier OP-P, and the first power amplifier OP-P amplifies the driving capability of the analog data signal to output an amplified analog data signal to the first output terminal OUT1; and the second digital-to-analog converter DAC-N receives a digital data signal Data2 and inputs a digital-to-analog converted analog data signal to the second power amplifier OP-N, and the second power amplifier OP-N amplifies the driving capability of the analog data signal to output an amplified analog data signal to the second output terminal OUT2. The driving method of the source driving circuit includes a power-on reset stage and a data output stage. In the power-on reset stage, the first output terminal OUT1 and the second output terminal OUT2 of each output channel are short-circuited to neutralize the charge of the data line. In the data output stage, one of the first output terminal OUT1 and the second output terminal OUT2 outputs the data signal to the data line.

In the source driving circuit shown in FIG. 6, in order to extend the length of the negative data signal falling edge of the source driving circuit, generally, it is necessary to provide different driving currents to the first power amplifier OP-P and the second power amplifier OP-N. However, when the first power amplifier OP-P and the second power amplifier OP-N have different driving currents, there is a voltage difference between the first output terminal OUT1 of the first power amplifier OP-P and the second output terminal OUT2 of the second power amplifier OP-N. In the power-on reset stage of the source driving circuit, the voltage difference between the first output terminal OUT1 and the second output terminal OUT2 may form a current within each output channel.

Figure 7:
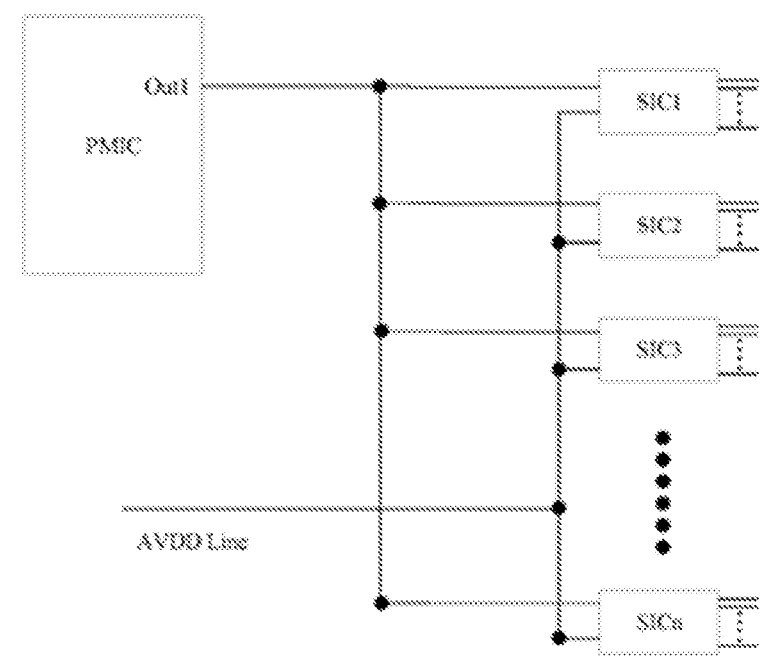
FIG. 7 is a schematic structural diagram of a display panel in the related art.
Figure 8:
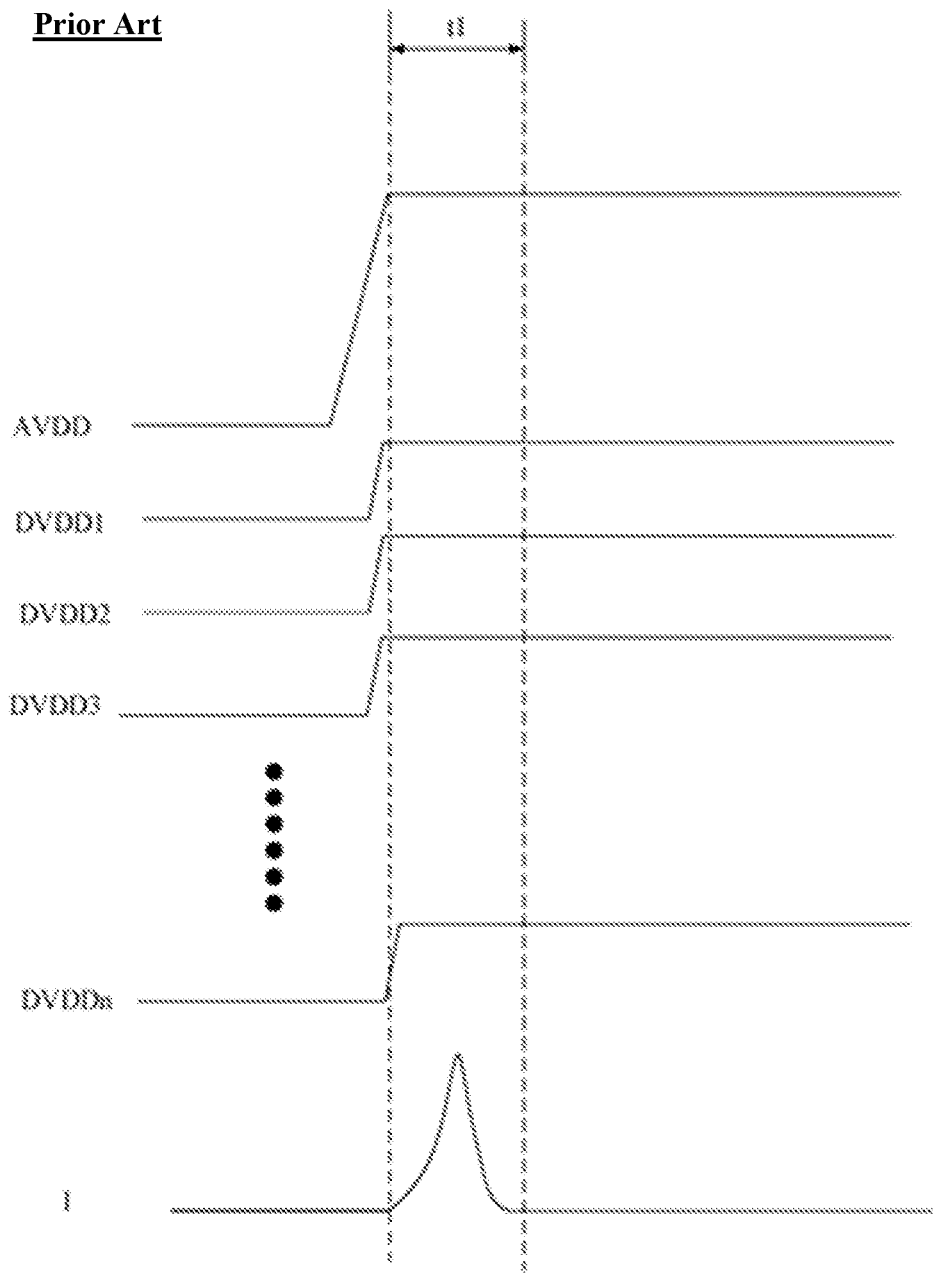
FIG. 8 is a timing diagram of each node on the display panel in FIG. 7.

As shown in FIG. 7, which is a schematic structural diagram of a display panel in the related art, the display panel includes a power management circuit PMIC and a plurality of source driving chips SIC1-n. Each source driving chip SIC is integrated with the above source driving circuit. Each source driving circuit includes a plurality of output channels. A first output terminal Out1 of the power management circuit PMIC is used to input a digital power signal DVDD to the plurality of source driving chips SIC1-$n$, and an analog power signal output bus AVDD Line is used to input the analog power signal AVDD to the plurality of source driving chips SIC1-$n$. After the source driving chip SIC receives the digital power signal DVDD, the first power amplifier OP-P and the second power amplifier OP-N shown in FIG. 6 output data signals. As shown in FIG. 8, which is a timing diagram of each node on the display panel in FIG. 7, DVDD1 refers to the timing of the digital power signal voltage received by the source driving chip SIC1, DVDD2 refers to the timing of the digital power signal voltage received by the source driving chip SIC2, DVDD3 refers to the timing of the digital power signal voltage received by the source driving chip SIC3, and so on, DVDDn refers to the timing of the digital power signal voltage received by the source driving chip SICn, AVDD refers to a timing diagram of the voltage on the analog power signal output bus AVDD Line, and I refers to a timing diagram of current on the output bus AVDD Line. As shown in FIG. 8, during the power-on reset stage t1 of the source driving circuit, the currents of all output channels on the plurality of source driving chips converge, causing the current I of the analog power signal output bus AVDD Line to be too large, and ultimately damaging the components connected to said output bus.

Figure 9:
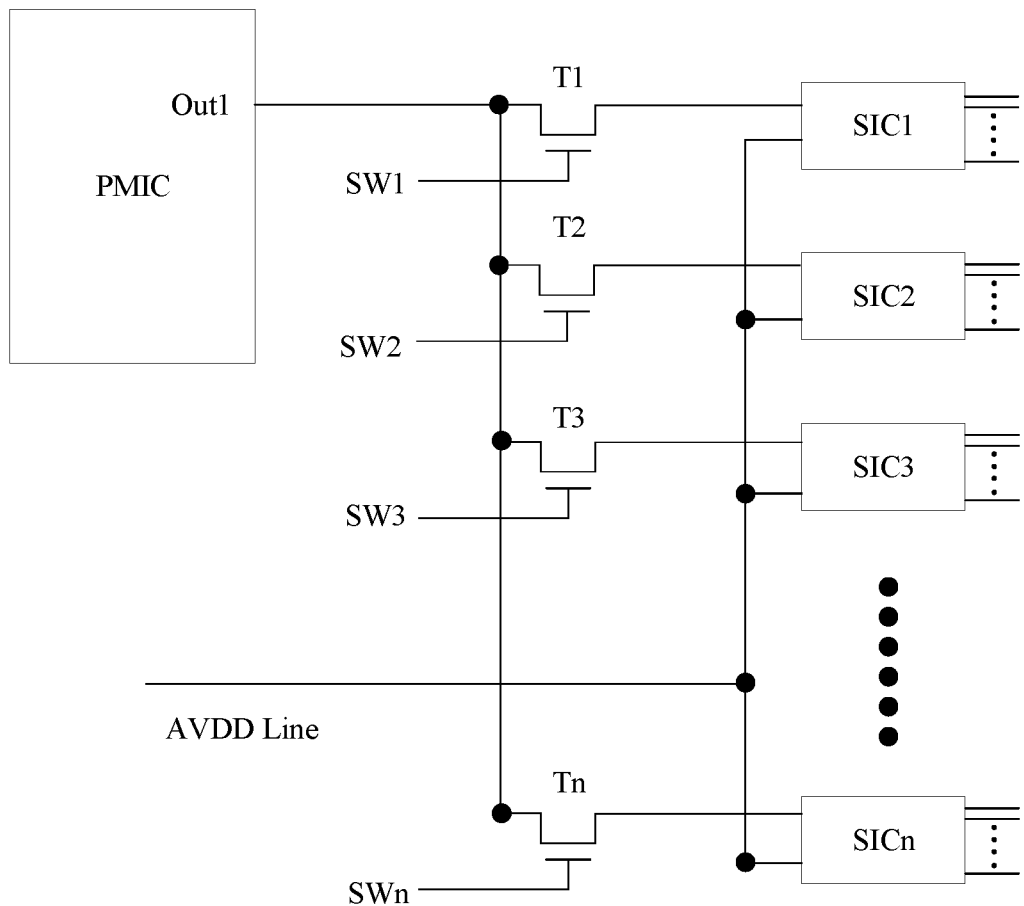
FIG. 9 is a schematic structural diagram of an exemplary embodiment of a display panel of the present disclosure.

In this regard, the present exemplary embodiment provides a display panel, as shown in FIG. 9, which is a schematic structural diagram of an exemplary embodiment of the display panel of the present disclosure. The display panel may include: n source driving chips SIC1-$n$, a power management circuit PMIC, and n switching units T1-$n$. The power management circuit PMIC may include a first output terminal Out1, and the first output terminal Out1 may be used to provide a digital power signal to the source driving chips; the plurality of switching units T1-$n$ may be respectively arranged in a one-to-one correspondence with the source driving chips SIC1-$n$, and control terminals of the switching units are respectively connected to control signal terminals SW1-$n$ in one-to-one correspondence. Wherein the switching unit T1 is arranged corresponding to the source driving chip SIC1, and the control terminal of the switching unit T1 is connected to the control signal terminal SW1; the switching unit T2 is arranged corresponding to the source driving chip SIC2, and the control terminal of the switching unit T2 is connected to the control signal terminal SW2; the switching unit T3 is arranged corresponding to the source driving chip SIC3, and the control terminal of the switching unit T3 is connected to the control signal terminal SW3; and so on, the switching unit Tn is arranged corresponding to the source driving chip SICn, and the control terminal of the switching unit Tn is connected to the control signal terminal SWn. Each switching unit is connected between the first output terminal Out1 and its corresponding source driving chip, and is used for sequentially turning on the corresponding source driving chip and the first output terminal Out1 in response to a signal of the control signal terminal. Wherein, n is a positive integer greater than 1, for example, n may be equal to 24.

Figure 10:
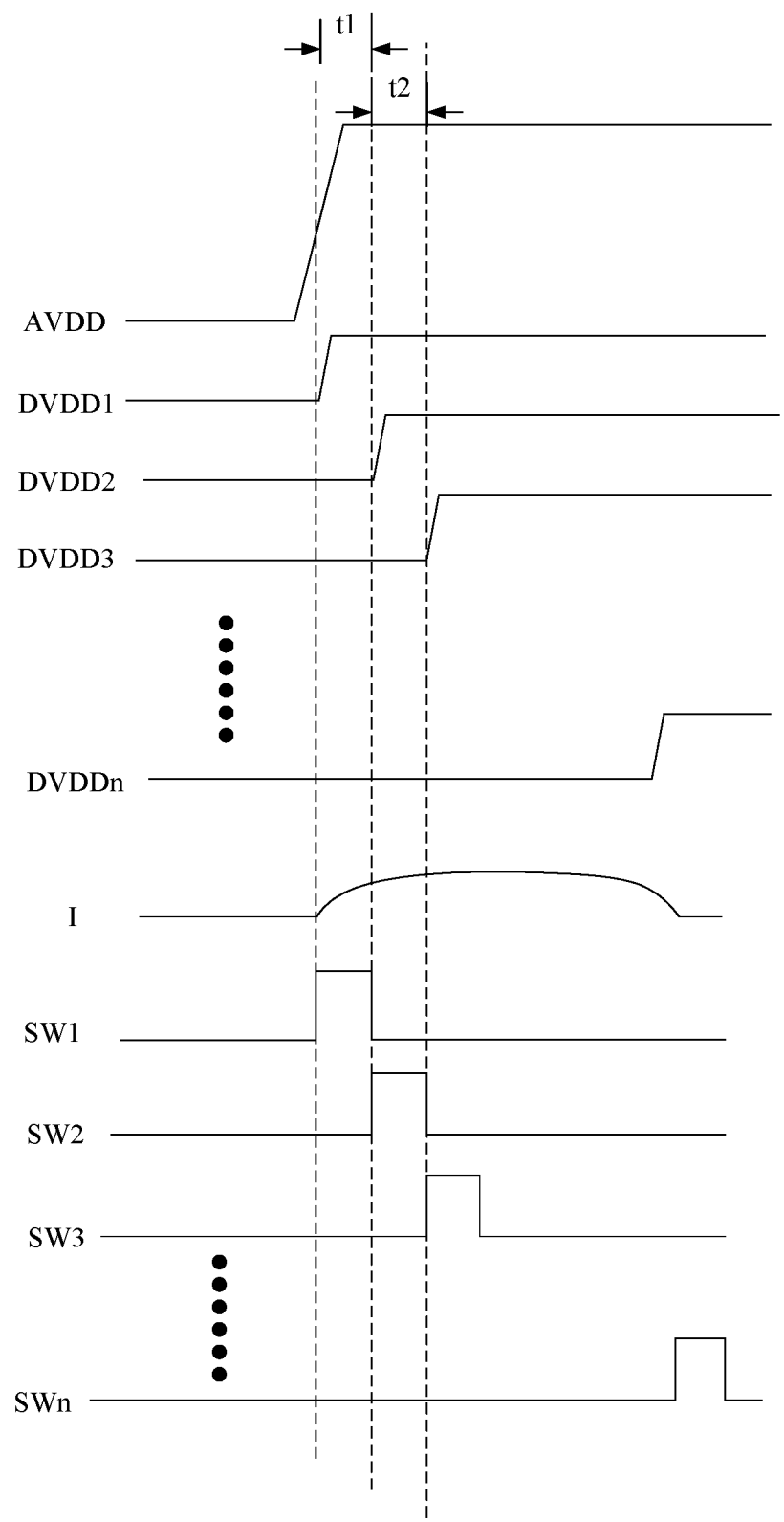
FIG. 10 is a timing diagram of each node on the display panel in FIG. 9.

As shown in FIG. 10, which is a timing diagram of each node on the display panel in FIG. 9, DVDD1 refers to the timing of the digital power signal voltage received by the source driving chip SIC1, DVDD2 refers to the timing of the digital power signal voltage received by the source driving chip SIC2, DVDD3 refers to the timing of the digital power signal voltage received by the source driving chip SIC3, and so on, DVDDn refers to the timing of the digital power signal voltage received by the source driving chip SICn, AVDD refers to the timing of voltage on the output bus AVDD Line, I refers to the timing of current on the output bus AVDD Line, SW1 is the timing of the voltage of the control signal terminal SW1, SW2 is the timing of the voltage of the control signal terminal SW2, SW3 is the timing of the voltage of the control signal terminal SW3, and so on, SWn is the timing of the voltage of the control signal terminal SWn. As shown in FIG. 10, the plurality of control signal terminals output an effective level signal (high level) sequentially, the switching units turn on the corresponding source driving chips and the first output terminal Out1 sequentially, and respective source driving chips sequentially receive the effective level of the digital power signal. For example, as shown in FIG. 10, in a time period t1, the control signal terminal SW1 outputs the effective level, the switching unit T1 is turned on, and the source driving chip SIC1 receives the effective level of the digital power signal; in a time period t2, the control signal terminal SW2 outputs the effective level, the switching unit T2 is turned on, and the source driving chip SIC2 receives the effective level of the digital power signal; and so on. Different source driving chips receive the effective level of the digital power signal in different time periods, such that the output channels in different source driving chips generate current in different time periods. Because the current value collected by the output channel in a single source driving chip is small, as shown by I in FIG. 10, the current is not enough to damage the components in the display panel.

The exemplary embodiment provides a display panel. On one hand, the display panel can solve the technical problem of the display afterimage in the related art; on the other hand, the display panel can avoid excessive current in the analog power signal output bus, thereby reducing the risk of damage to the components of the display panel by the large current in the analog power signal output bus.

In the exemplary embodiment, as shown in FIG. 9, each switching unit is arranged corresponding to one source driving chip, and the switching units can be turned on one by one. It should be understood that in other exemplary embodiments, one switching unit may also be arranged corresponding to multiple source driving chips, and the number of source driving chips arranged corresponding to each switching unit may be the same or different. Multiple switching units may form multiple switching unit groups, each switching unit group may include multiple switching units, and the switching unit groups can be turned on group by group.

In the exemplary embodiment, the display panel may include the pixel driving circuit shown in FIG. 1 and the source driving circuit shown in FIGS. 5 and 6. It should be understood that in other exemplary embodiments, the display panel may further include other pixel driving circuits and source driving circuits.

Figure 11:
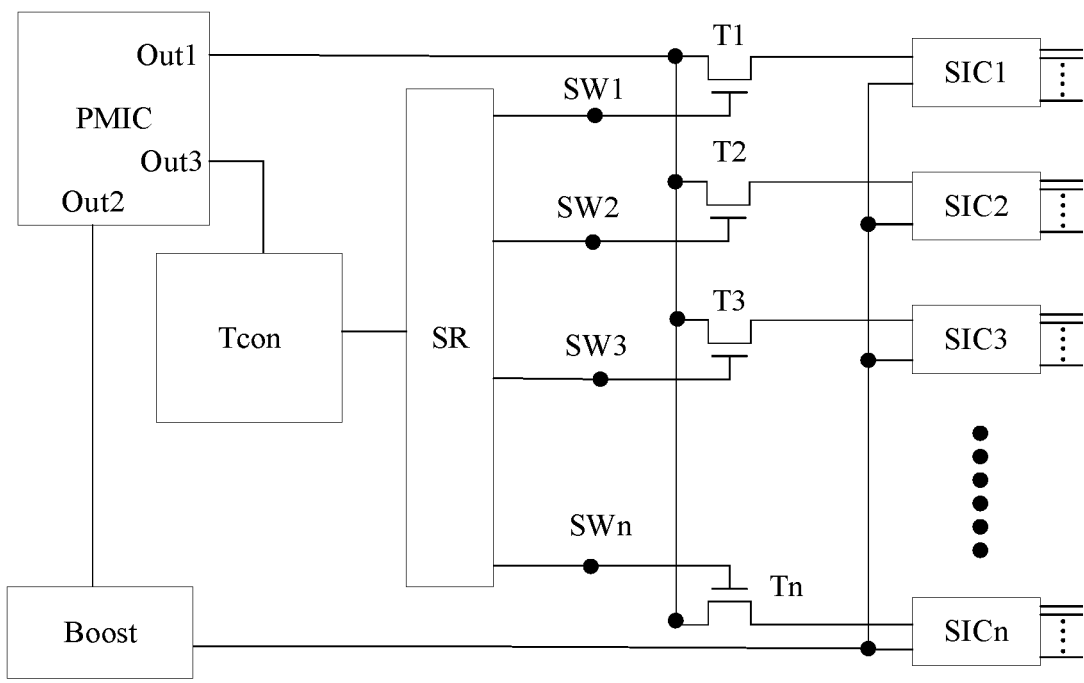
FIG. 11 is a schematic structural diagram of another exemplary embodiment of a display panel of the present disclosure.

In an exemplary embodiment, as shown in FIG. 11, which is a schematic structural diagram of another exemplary embodiment of a display panel of the present disclosure, the display panel may further include: a shift signal output circuit SR. The shift signal output circuit SR may include a plurality of cascaded shift register units, and the shift register units may be arranged in a one-to-one correspondence with the switching units. Output terminals of the shift register units may be connected to control terminals of the switching units, to sequentially input a shift signal to the plurality of the switching units. Thus, the switching units can be turned on one by one. When multiple switching units form multiple switching unit groups, and the multiple switching unit groups are turned on group by group, the output terminals of the shift register units may be connected to the control terminals of the same group of switching units at the same time, so that the switching unit groups are turned on group by group. As shown in FIG. 11, the display panel may further include a clock control circuit Tcon. The shift signal output circuit SR may output the shift signal under the action of control signals such as an initialization signal and a clock signal, which may be provided by the clock control circuit Tcon. The power management circuit PMIC may further include a third output terminal Out3, and the third output terminal Out3 of the power management circuit PMIC may provide a digital power signal to the clock control circuit Tcon.

In the exemplary embodiment, the power management circuit PMIC may further include a second output terminal Out2, which is used to provide an analog power signal. The display panel may further include a boost circuit Boost, which may be connected between the second output terminal Out2 and the plurality of source driving chips, and is used to boost the analog power signal and provide the source driving chips with boosted analog power signal. The boost circuit Boost can improve the driving capability of the analog power signal. An output terminal of the boost circuit Boost is connected to the analog power signal output bus, and the display panel can prevent the large current on the analog power signal output bus from burning the boost circuit.

In the exemplary embodiment, as shown in FIGS. 9 and 11, the switching unit may include a switching transistor, wherein a first terminal of the switching transistor is connected to the first output terminal, a second terminal thereof is connected to the corresponding source driving chip, and a control terminal thereof is connected to the control signal terminal. Wherein, the switching transistor may be an N-type switching transistor or a P-type switching transistor.

The exemplary embodiment also provides a display panel driving method for driving the above display panel, which includes:

in the power-on reset stage of the source driving chip, inputting different control signals to at least part of the control terminals of the switching units to turn on the switching units in different time periods.

In an exemplary embodiment of the present disclosure, the control terminals of the switching units are connected to different control signal terminals, and the driving method includes: sequentially inputting turned-on signals to the different control signal terminals.

The display panel driving method provided by the present disclosure has been described in detail in the above content, and will not be repeated here.

The exemplary embodiment also provides a display device including the above display panel. The display device may be a displayer in a mobile phone, a TV, a tablet computer, and the like.

Those skilled in the art will readily contemplate other embodiments of the present disclosure after considering the specification and practicing the disclosure disclosed herein. This application is intended to cover any variations, uses, or adaptations of the present disclosure that conform to the general principles of the disclosure and include the common general knowledge or conventional technical means in the technical field not disclosed by the disclosure. It is intended that the specification and examples be considered as exemplary only, with a true scope and spirit of the disclosure being indicated by the appended claims.

What is claimed is:

1. A display panel, comprising:
    a plurality of source driving chips;
    a power management circuit, comprising a first output terminal, the first output terminal being configured to provide a digital power signal to the source driving chips; and
    a plurality of switching units, respectively arranged corresponding to at least one of the source driving chips, the switching units being connected between the first output terminal and corresponding source driving chips, and at least part of the switching units being configured to be conductive, in response to different control signals, between the corresponding source driving chips and the first output terminal in different time periods.

2. The display panel according to claim 1, wherein each of the switching units is arranged corresponding to a same number of the source driving chips.

3. The display panel according to claim 2, wherein the switching units are arranged in a one-to-one correspondence with the source driving chips.

4. The display panel according to claim 1, wherein control terminals of different switching units are connected to different control signal terminals, and the switching units are turned on sequentially under action of the control signal terminals.

5. The display panel according to claim 1, further comprising:
    a shift signal output circuit, comprising a plurality of cascaded shift register units, the shift register units being arranged in a one-to-one correspondence with the switching units, and output terminals of the shift register units being connected to control terminals of the switching units, and configured to sequentially input a shift signal to the plurality of the switching units.

6. The display panel according to claim 5, wherein the display panel comprises a clock control circuit, and the shift signal output circuit outputs the shift signal under action of a clock signal and an initialization signal provided by the clock control circuit.

7. The display panel according to claim 1, wherein the power management circuit further comprises a second output terminal for providing an analog power signal, and
    the display panel further comprises a boost circuit, connected between the second output terminal and the plurality of source driving chips, and configured to boost the analog power signal and provide the source driving chips with boosted analog power signal.

8. The display panel according to claim 1, wherein the switching unit comprises:
    a switching transistor, comprising a first terminal connected to the first output terminal, a second terminal connected to a corresponding source driving chip, and a control terminal connected to the control signal terminal.

9. The display panel according to claim 1, wherein the source driving chip comprises:
    a first power amplifier, configured to output a positive driving signal; and
    a second power amplifier, configured to output a negative driving signal,
    wherein the first power amplifier and the second power amplifier have are provided with different driving currents.

10. A method for driving a display panel, wherein the display panel comprises: a plurality of source driving chips;

a power management circuit, comprising a first output terminal, the first output terminal being configured to provide a digital power signal to the source driving chips; and a plurality of switching units, respectively arranged corresponding to at least one of the source driving chips, the switching units being connected between the first output terminal and corresponding source driving chips, and at least part of the switching units being configured to be conductive, in response to different control signals, between the corresponding source driving chips and the first output terminal in different time periods, the method comprising:

in a power-on reset stage of the source driving chip, inputting different control signals to control terminals of at least part of the switching units to turn on the switching units in different time periods.

11. The method according to claim 10, wherein the control terminals of different switching units are connected to different control signal terminals, and the method further comprises: sequentially inputting turned-on signals to the different control signal terminals.

12. A display device comprising a display panel, wherein the display panel comprises:

a plurality of source driving chips;

a power management circuit, comprising a first output terminal, the first output terminal being configured to provide a digital power signal to the source driving chips; and a plurality of switching units, respectively arranged corresponding to at least one of the source driving chips, the switching units being connected between the first output terminal and corresponding source driving chips, and at least part of the switching units being configured to be conductive, in response to different control signals, between the corresponding source driving chips and the first output terminal in different time periods.

13. The display device according to claim 12, wherein each of the switching units is arranged corresponding to a same number of the source driving chips.

14. The display device according to claim 13, wherein the switching units are arranged in a one-to-one correspondence with the source driving chips.

15. The display device according to claim 12, wherein control terminals of different switching units are connected to different control signal terminals, and the switching units are turned on sequentially under action of the control signal terminals.

16. The display device according to claim 12, wherein the display panel further comprises:

a shift signal output circuit, comprising a plurality of cascaded shift register units, the shift register units being arranged in a one-to-one correspondence with the switching units, and output terminals of the shift register units being connected to control terminals of the switching units, and configured to sequentially input a shift signal to the plurality of the switching units.

17. The display device according to claim 16, wherein the display panel comprises a clock control circuit, and the shift signal output circuit outputs the shift signal under action of a clock signal and an initialization signal provided by the clock control circuit.

18. The display device according to claim 12, wherein the power management circuit further comprises a second output terminal for providing an analog power signal, and the display panel further comprises a boost circuit, connected between the second output terminal and the plurality of source driving chips, and configured to boost the analog power signal and provide the source driving chips with boosted analog power signal.

19. The display device according to claim 12, wherein the switching unit comprises:

a switching transistor, comprising a first terminal connected to the first output terminal, a second terminal connected to a corresponding source driving chip, and a control terminal connected to the control signal terminal.

20. The display device according to claim 12, wherein the source driving chip comprises:

a first power amplifier, configured to output a positive driving signal; and a second power amplifier, configured to output a negative driving signal, wherein the first power amplifier and the second power amplifier are provided with different driving currents.

* * * * *